UNITED STATES PATENT OFFICE.

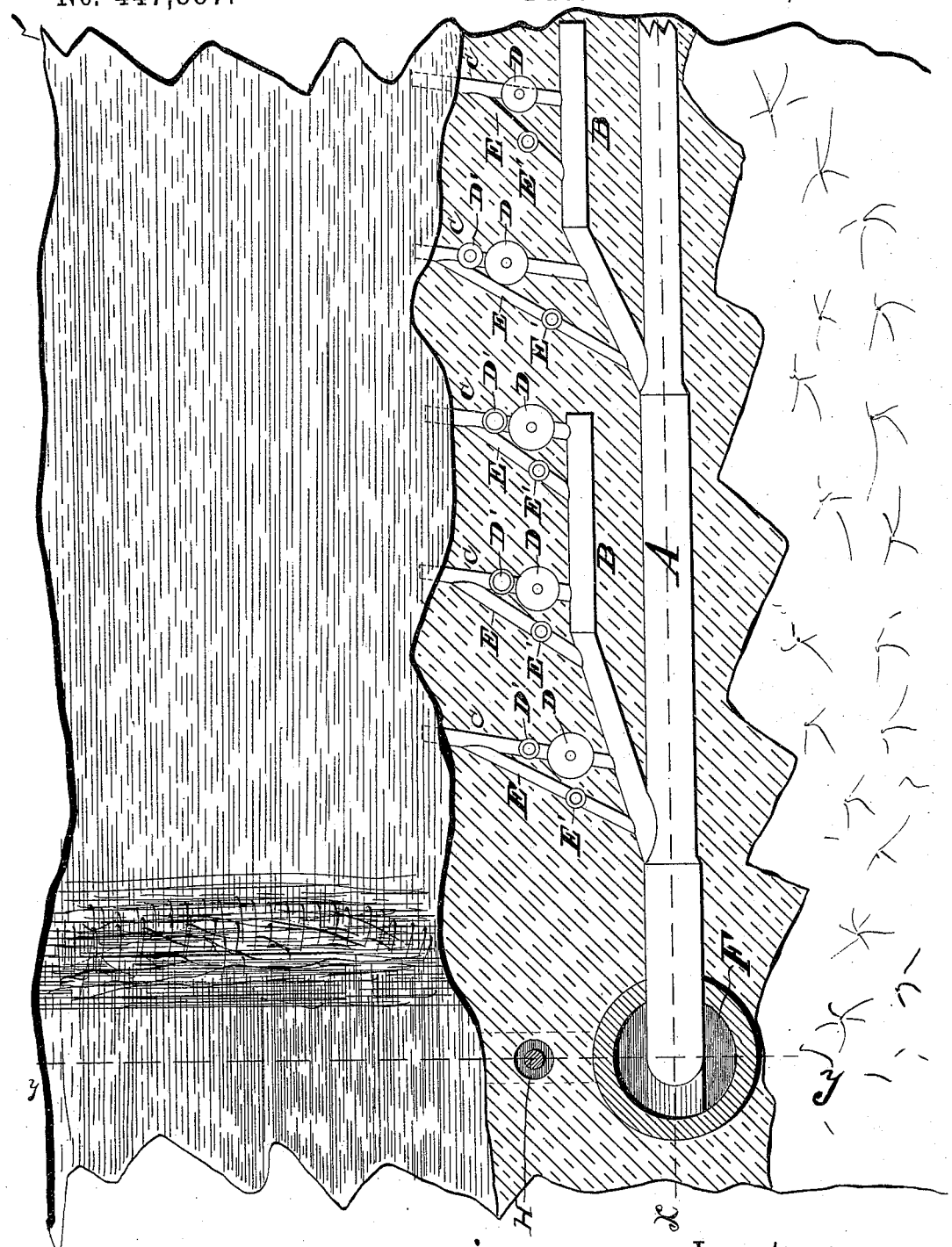

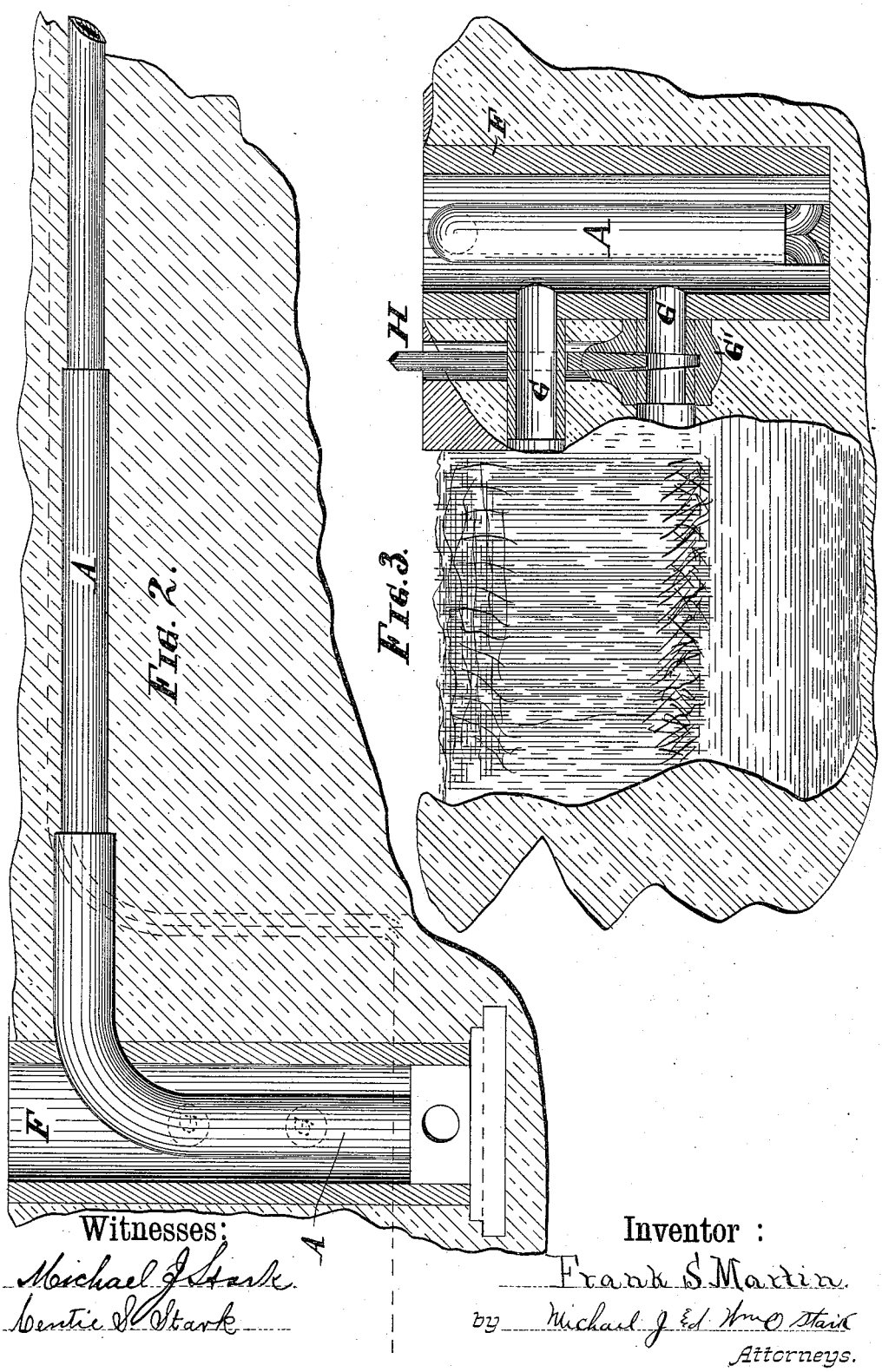

FRANK S. MARTIN, OF HAMBURG, NEW YORK.

APPLIANCE FOR UTILIZING RIVER-CURRENTS AND WATER-FALLS.

SPECIFICATION forming part of Letters Patent No. 447,887, dated March 10, 1891.

Application filed July 2, 1890. Serial No. 357,544. (No model.)

*To all whom it may concern:*

Be it known that I, FRANK S. MARTIN, of Hamburg, in the county of Erie and State of New York, have invented certain new and useful Improvements in Utilizing River-Currents and Water-Falls; and I do hereby declare that the following description of my said invention, taken in connection with the accompanying sheet of drawings, forms a full, clear, and exact specification, which will enable others skilled in the art to which it appertains to make and use the same.

This invention has general reference to improvements in appliances for utilizing the power in the falls and rapids of rivers; and it consists, essentially, in the novel and peculiar combination of parts and details of construction, as hereinafter first fully set forth and described, and then pointed out in the claims.

In the drawings already referred to, Figure 1 is a plan of a river and falls and showing the relative position and arrangement of my invention. Fig. 2 is a longitudinal sectional elevation in line $x\,x$ of Fig. 1, the dotted line shown therein indicating the fall in said river. Fig. 3 is a transverse sectional elevation in line $y\,y$ of Fig. 1.

The object of this invention is the production of efficient means for the utilization of power contained in water-falls and rapids, and the provision of suitable devices whereby the entire head of the water may be utilized or only a portion thereof.

A in the drawings represents the main pipe of my system, it being preferably underground and running from the starting-point above to the falls at some distance from or on the bottom of the river. Into this main pipe lead offsets or branches B at suitable distances, the main pipe A being enlarged proportionately after the introduction of each offset, as shown in Fig. 1, whereby an even velocity of water is obtained throughout the entire pipe. Into the offsets before mentioned lead connecting pipes C, connecting with the river and entering the same below the low-water line, and having suitable turbines or other water-motors D for the generation of power, there being placed in said pipes between said turbines and the river stop or gate valves D', whereby said turbines may be stopped when desired. With these pipes C are connected auxiliary pipes E, also leading into the offsets B before mentioned, they being provided with valves E' to cut off communication. The object of these pipes is mainly to provide a means for diverting the inflow of water from the pipe C, thereby relieving the valve D' of the pressure of water should it be necessary to repair the same.

At the extremity of the main pipe A, preferably at the falls of the river, is provided a water seal to regulate the effective head of the water, and it consists of a pit F, suitably constructed, of a depth exceeding the extreme height of fall of water, so that its bottom will be sufficiently below the low-water line of the river below the falls. Into this pit and to the bottom thereof leads the pipe A, as shown in Figs. 2 and 3, and is supported there by suitable masonry and discharges its water at the extreme bottom thereof. This pit F, before mentioned, is provided with a series of discharge-openings G at different heights and of a capacity equaling the capacity of the pipe A. These discharges are each provided with a stop or gate valve G' to close them, said valves being manipulated by the valve-stems H.

In Fig. 3 I have shown but two discharge-openings; but I may provide more, it being dependent upon the height of the fall of the water.

The operation of this device is as follows: The system being constructed in accordance with the foregoing and ready for operation, the stop-valves of the several discharges in the pit F are closed and the pipe A flooded by opening one or more of the valves E' in the branches E and closing the valves G' in the discharge-pipes G of the pit F. The water entering the pipe A will gradually fill the entire pit and the pipe A until the level in said pit corresponds with that in the river above, when further passage of water through the main pipe will cease. If now one of the valves G' in the pit F be opened, water will discharge therefrom, and thereby start a current in the main pipe A corresponding to the supply through the pipes E or C. If the branches E are now closed, the turbines D will be operated by the water passing through the pipes C and continue to operate as long as the valves D' or one or more of them and one of the gate-valves G' in the pit F remains open.

If desired, the effective head of the water flowing through the main pipe A may be reduced by closing the lower gate-valve G' in the discharge-pipe G of the pit F and opening a higher one therein, in which case the pit will fill to the level of the higher discharge, and thereby cause a back-pressure in the main pipe A equal to the distance between the lower and higher discharges.

It will be observed that one of the advantages of the construction of the system of utilizing the currents and falls of rivers, as described, is that in case power is not desired on any point of the system the pit may be allowed to fill by closing the gate-valves G', thereby releasing the main pipe and its branches from all pressure.

It is evident that the main pipe can be laid a considerable distance away from the river, it not being necessary to run adjacent and parallel to the same. In this way I am enabled to select the most favorable and advantageous as well as most direct route to the spot where the water-falls are located, and then run the offsets toward the river and connect the same by the pipes C. If the pipes C before mentioned are of sufficient length, several turbines may be connected to each pipe, and thereby obtain the greatest advantages from the power of the water. It is further evident that it is not necessary to locate the pit F at the falls. It may be located at any advantageous point below the same without disturbing the operation of my invention.

In some instances I may dispense with the offsets B and run the pipe C directly into the pipe A.

It will be seen that upon closing one of the pipes C the influx of water is reduced to an amount equal to the capacity of such pipe. This action in no way affects the operation of the remainder of the pipes, the only change in operation being that the pipe A discharges a smaller amount of water.

The pipes of this system may, if desired, be placed above the water-line of the river on the surface of the ground without materially affecting the operation of my system.

By the use of my system the whole head of the falls may be utilized at a distance away from the same without being compelled to construct underground tunnels on a level, or nearly so, with the lower water-level to attain the desired result.

Having thus fully described my invention, I claim as new, and desire to secure to me by Letters Patent of the United States—

1. The combination, with the water-supply source, of a main pipe connected with the same, one extremity of which extending beyond the lower water-level of said supply-source and provided with a water seal at the discharge end of said pipe, consisting of a pit having a discharge located above the discharge of said main pipe, as set forth.

2. The combination, with the water source, of a main pipe connected with the same and having one extremity extending downward to below the lower level of said source, a water seal around said downwardly-extending portion and having discharge-openings at different elevations in the same, and valves controlling said openings, substantially as described.

3. The combination, with the main pipe having the downwardly-projecting discharge, of a water seal around the same, consisting of a pit, the said pipe discharging into the lowest point thereof, discharge-openings at various elevations in said pit, and valves controlling said discharge-openings.

4. The combination, with the water-supply source, of a main pipe composed of sections of different diameters, and auxiliary pipes connecting therewith and with the water-supply source and provided with water-motors, said main pipe having a downwardly-projecting discharge-pipe, substantially as and for the purpose set forth.

5. The combination, with the water-supply source, of the main pipe, the offsets connecting therewith, the pipes connecting with the water-supply source and said offsets, water-motors within said pipes controlled by valves, as described, and auxiliary pipes E, connecting said pipes and provided with stop-valves, substantially as described.

In testimony that I claim the foregoing as my invention I have hereto set my hand in the presence of two subscribing witnesses.

F. S. MARTIN.

Witnesses:
MICHAEL J. STARK,
WM. O. STARK.